(12) United States Patent
Oda (10) Patent No.: US 8,368,524 B2
(45) Date of Patent: Feb. 5, 2013

(54) TIRE STATE VARIABLES MANAGEMENT SYSTEM

(75) Inventor: Keiji Oda, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 276 days.

(21) Appl. No.: 12/678,093

(22) PCT Filed: Aug. 28, 2008

(86) PCT No.: PCT/JP2008/065440
§ 371 (c)(1),
(2), (4) Date: Mar. 12, 2010

(87) PCT Pub. No.: WO2009/034850
PCT Pub. Date: Mar. 19, 2009

(65) Prior Publication Data
US 2010/0225464 A1    Sep. 9, 2010

(30) Foreign Application Priority Data

Sep. 14, 2007 (JP) .................................. 2007-239669

(51) Int. Cl.
*B60C 23/00* (2006.01)
*B60C 23/02* (2006.01)
*B60C 23/06* (2006.01)
*E01C 23/00* (2006.01)
*G01M 17/02* (2006.01)

(52) U.S. Cl. .......... 340/442; 340/445; 340/447; 73/146; 116/34 R (58) Field of Classification Search .................. 340/459, 340/442, 445, 447; 343/713; 73/146
See application file for complete search history.

(56) References Cited

U.S. PATENT DOCUMENTS 6,441,728 B1 * 8/2002 Dixit et al. .................... 340/447
(Continued)

FOREIGN PATENT DOCUMENTS

| JP | 2003-002019 A | 1/2003 |
| JP | 2003-151064 A | 5/2003 |
| JP | 2004-017909 A | 1/2004 |
| JP | 2004-82814 A | 3/2004 |
| JP | 2005-193861 A | 7/2005 |
| JP | 2005-206073 A | 8/2005 |
| JP | 2006-138156 A | 6/2006 |
| JP | 2007-216832 A | 8/2007 |

(Continued)

OTHER PUBLICATIONS

International Search Report of PCT/JP2008/065440 dated Dec. 9, 2008.

*Primary Examiner* — Benjamin C Lee
*Assistant Examiner* — Adam Carlson
(74) *Attorney, Agent, or Firm* — Sughrue Mion, PLLC (57) ABSTRACT

The present invention provides a tire state variables management system where an external module can reliably receive data from a specific sensor module from which data is to be acquired when an external module transmits to the sensor module a command signal for requesting data transmission. Each sensor module 3 possesses a self-identifying code for distinguishing itself from other sensor modules; the command signal transmitted by the external module 2 includes the self-identifying code possessed by the sensor module 3 from which data is to be acquired; and the sensor module 3 is adapted to transmit the data only when the self-identifying code included in the command signal from the external module 2 coincides with the self-identifying code possessed by itself.

5 Claims, 5 Drawing Sheets

U.S. PATENT DOCUMENTS

| | | | |
|---|---|---|---|
| 6,920,785 B2 * | 7/2005 | Toyofuku | 73/146 |
| 7,173,520 B2 * | 2/2007 | Desai et al. | 340/442 |
| 7,230,528 B2 * | 6/2007 | Kates | 340/521 |
| 7,250,852 B1 * | 7/2007 | Kell | 340/447 |
| 7,941,534 B2 * | 5/2011 | de la Huerga | 709/225 |
| 2002/0063623 A1 | 5/2002 | Juzswik | |
| 2002/0130771 A1 * | 9/2002 | Osborne et al. | 340/438 |
| 2003/0227379 A1 | 12/2003 | Itou | |
| 2005/0068161 A1 | 3/2005 | Ichinose et al. | |
| 2005/0151634 A1 | 7/2005 | Tsuji et al. | |
| 2006/0048567 A1 * | 3/2006 | Shimura | 73/146.5 |
| 2006/0103240 A1 | 5/2006 | Naito et al. | |

\* cited by examiner

TIRE STATE VARIABLES MANAGEMENT SYSTEM

TECHNICAL FIELD

The present invention relates to improvement of a tire state variables management system provided with: a sensor module mounted on each tire of a vehicle having plural tires, for detecting tire state variables including tire internal pressure and transmitting data of the tire state variables on the basis of a command signal from the outside of the vehicle; and an external module disposed on the outer side of the vehicle, for transmitting the command signal to the sensor module and receiving the data transmitted from the sensor module to acquire data of the tire state variables.

PRIOR ART

There has been known a tire state variables management system which, by using a sensor module mounted inside of a tire for detecting tire state variables such as tire internal pressure, temperature and the like and an external module disposed on the outer side of the vehicle, transmits to the sensor module a command signal for requesting transmission of data of the tire state variables and receives the data transmitted from the sensor module, so that maintenance of the tires can be carried out based on the data to effect management of tires in a running state.

DISCLOSURE OF THE INVENTION

Problems to be Solved by the Invention

In such a tire state variables management system as described above, acquisition of data of tire state variables is carried out as follows. Specifically, in a case where the external module is a hand-held type, an operator who makes measurement holds the external module, moves near to a tire of which state variables should be acquired and operates the external module to transmit the command signal. The sensor module, which has received the command signal, transmits data regarding the tire state variables, so that the external module receives and thus acquires the data of the tire state variables.

In the case described above, the sensor module as the transmission source of data is specified by setting a range which radio wave of the command signal transmitted by the external module can reach relatively narrow so that only the sensor module closest to the external module can respond to the command signal.

In a case where the external module is a fixed type, data of respective tires mounted on a vehicle is acquired by making the vehicle pass in the vicinity of the external module, sequentially receiving data of tire state variables transmitted from the sensor modules corresponding to the respective tires mounted on the vehicle, and correlating the order of the received data with the order of the tires by which the tires approached the external sensor.

In this case, as in the previous case, the correlation is carried out by setting a range which radio wave of the command signal transmitted by the external module can reach narrow enough to prevent the plural sensor modules from responding simultaneously.

However, for example, when plural tires are located proximate to each other (in a case of dual tires, in particular), the proximate external and internal tires are situated very close to each other, and there arises a problem that, whichever position the external module is disposed, the sensor modules of the both tires transmit data and it is not possible to determine which sensor module has sent the data. If a command signal is exceedingly weakened to solve this problem, the command signal may not be able to reach any of the sensor modules.

The present invention has been contrived in view of the problem described above and an object thereof is to provide a tire state variables management system where an external module can reliably receive data from a specific sensor module when the external module transmits to the sensor module a command signal for requesting data transmission.

Means for Solving the Problem

In a first aspect <1> of the present invention, a tire state variables management system provided with: a sensor module mounted on each tire of a vehicle having plural tires, for detecting tire state variables including tire internal pressure and transmitting data of the tire state variables on the basis of a command signal from the outside of the vehicle; and an external module disposed on the outer side of the vehicle, for transmitting the command signal to the sensor module and receiving the data transmitted from the sensor module to acquire data of the tire state variables, characterized in that: each sensor module possesses a self-identifying code for distinguishing itself from other sensor modules; the command signal transmitted by the external module includes the self-identifying code possessed by the sensor module from which data is to be acquired; and each sensor module is adapted to transmit the data only when the self-identifying code included in the command signal from the external module coincides with the self-identifying code possessed by the sensor module itself.

In a second aspect <2> of the present invention, the tire state variables management system of the first aspect <1> is characterized in that the self-identifying code comprises information for identifying the vehicle on which the tire corresponding to the sensor module is mounted and information of a position at which the tire is mounted, in combination.

In a third aspect <3> of the present invention, the tire state variables management system of the second aspect <2> is characterized in that the sensor module is adapted to possess a serial number which is inherent thereto and irrelevant to the tire state, and the tire state variables management system further comprises a vehicle body side module provided on the body side of the vehicle, for transmitting to the sensor module a command signal for requesting transmission of data regarding the tire state variables. The command signal transmitted by the vehicle body side module includes the serial number possessed by the sensor module of which data is to be acquired, information for identifying the vehicle having the tire on which the sensor module of which data is to be acquired is mounted, and information of a position at which the tire is mounted in the vehicle, in combination. Each sensor module has a memory and is adapted to store therein the information for identifying the vehicle and the information of a position at which the tire is mounted in the vehicle, which are included in combination in the command signal, only when the serial number included in the command signal from the vehicle body side module coincides with the serial number possessed by the sensor module.

In a fourth aspect <4> of the present invention, the tire state variables management system of the third aspect <3> is characterized in that the sensor module is adapted to erase the information for identifying the vehicle and the information of a tire mounting position memorized in combination in the memory when the sensor module has not received the command signal from the vehicle body side module in a predetermined period or longer.

Effect of the Invention

According to the first aspect <1> of the present invention, each sensor module possesses a self-identifying code for distinguishing itself from other sensor modules; the command signal transmitted by the external module includes the self-identifying code possessed by the sensor module from which data is to be acquired; and each sensor module is adapted to transmit the data only when the self-identifying code included in the command signal from the external module coincides with the self-identifying code possessed by the sensor module itself. Therefore, even when the command signal transmitted from the external module is made sufficiently strong, only one sensor module responds to the command signal, whereby the sensor signal which has transmitted data can be specified and data from the target sensor module can be reliably obtained.

In the second aspect <2> of the present invention, the self-identifying code comprises information for identifying the vehicle on which the tire corresponding to the sensor module is mounted and information of a position at which the tire is mounted, in combination. Accordingly, for example, for an operator who is holding a hand-held-type external module for the purpose of acquiring data, all he/she has to do is to input the information for identifying the vehicle and the position of the tire to the external module for transmission. Specifically, in a case where data is to be acquired for each of plural tires mounted on a vehicle, what needs to be done is to input the information for identifying the vehicle, which information is common to all of these tires, only once and then sequentially input the information of positions at which the respective tires are mounted on the vehicle, whereby the sensor module from which data is to be acquired can be specified in a very simple and easy manner. If the information for identifying the vehicle were to be the sensor module ID uniquely set for each sensor module, instead of combination of the information for identifying the vehicle and the information of a position at which the tire is mounted in the vehicle, then the ID of a new sensor module would have to be inputted for every time when the sensor module from which data is to be acquired is changed. As a result, the operation would be very complicated.

In the third aspect <3> of the present invention, the sensor module is adapted to possess a serial number which is inherent thereto and irrelevant to the tire state, and the tire state variables management system further comprises a vehicle body side module provided on the body side of the vehicle, for transmitting to the sensor module a command signal for requesting transmission of data regarding the tire state variables. The command signal transmitted by the vehicle body side module includes the serial number possessed by the sensor module of which data is to be acquired, information for identifying the vehicle having the tire on which the sensor module of which data is to be acquired is mounted, and information of a position at which the tire is mounted, in combination. Each sensor module has a memory and is adapted to store therein the information for identifying the vehicle and the information of a position at which the tire is mounted in the vehicle, which informations are included in combination in the command signal, only when the serial number included in the command signal from the vehicle body side module coincides with the serial number possessed by the sensor module itself. Accordingly, in a case where the tire is moved to another mounting position within the same vehicle or another vehicle due to tire rotation, the information for identifying the vehicle and the information of the tire mounting position to be memorized in the memory of the sensor module can be renewed automatically and swiftly, whereby a correct response for a command signal from the external module is always ensured.

In the fourth aspect <4> of the present invention, the sensor module is adapted to erase the information for identifying the vehicle and the information of a tire mounting position memorized in combination in the memory when the sensor module has not received the command signal from the vehicle body side module in a predetermined period or longer. Accordingly, in a case where the tire is removed from the vehicle and put in a storehouse or a place for temporary storage, even when the tire is located within a range which is reached by radio wave of a command signal from the external module, an erroneous actuation by which the sensor module provided in the removed tire erroneously transmits data can be prevented. If the information for identifying the vehicle and the information of a tire mounting position were not be erased while the tire is removed from the vehicle and put in a storehouse or a place for temporary storage, there would be a possibility that two tires having the same information for identifying the vehicle, one of which tires is mounted on a vehicle and the other of which tires has been removed from the vehicle, coexist, whereby a response from an unexpected sensor module may not be reliably prevented.

EXPLANATION OF THE NUMERAL REFERENCES

1 Vehicle body side module
2 External module
3 Sensor module
5 Central control module
10 Tire state variables management system
12 Reception portion of Vehicle body side module
13 Transmission portion of Vehicle body side module
14 Memory of Vehicle body side module
15 Control portion of Vehicle body side module
16 Transmission/reception antenna of Vehicle body side module
21 Input portion
21a Transmission button
21b Input key
22 Display portion of External module
23 Transmission portion of External module
24 Reception portion of External module
25 Control portion of External module 26 Transmission/reception antenna of External module
31 Sensor portion
32 ROM of Sensor module
33 Memory of Sensor module
34 Reception portion of Sensor module
35 Transmission portion of Sensor module
36 Control portion of Sensor module
37 Transmission/reception antenna of sensor module
T Tire
W Wheel

BEST MODE FOR IMPLEMENTING THE INVENTION

Figure 1:
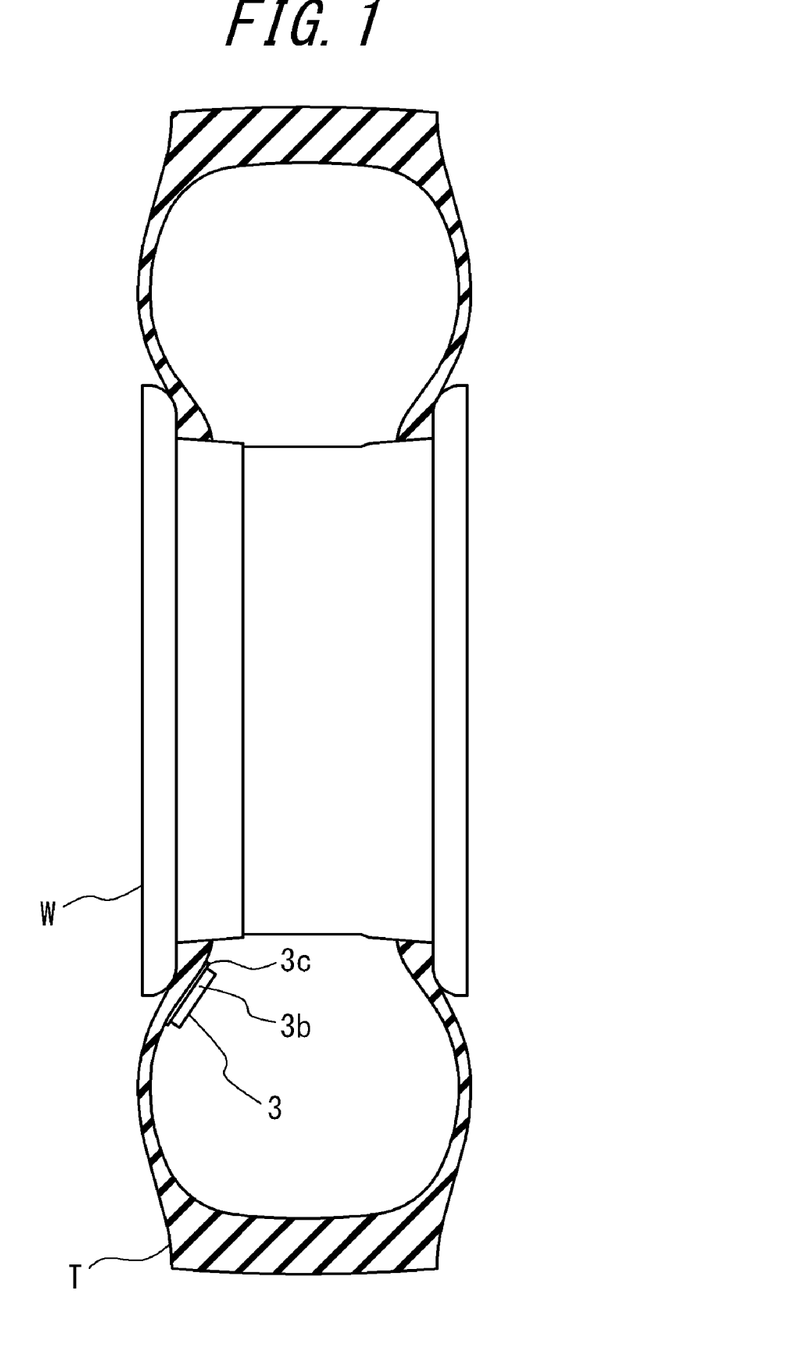
FIG. 1 is a sectional view showing a sensor module of an embodiment of the present invention, in a state in which the sensor module is provided in a tire.
Figure 2:
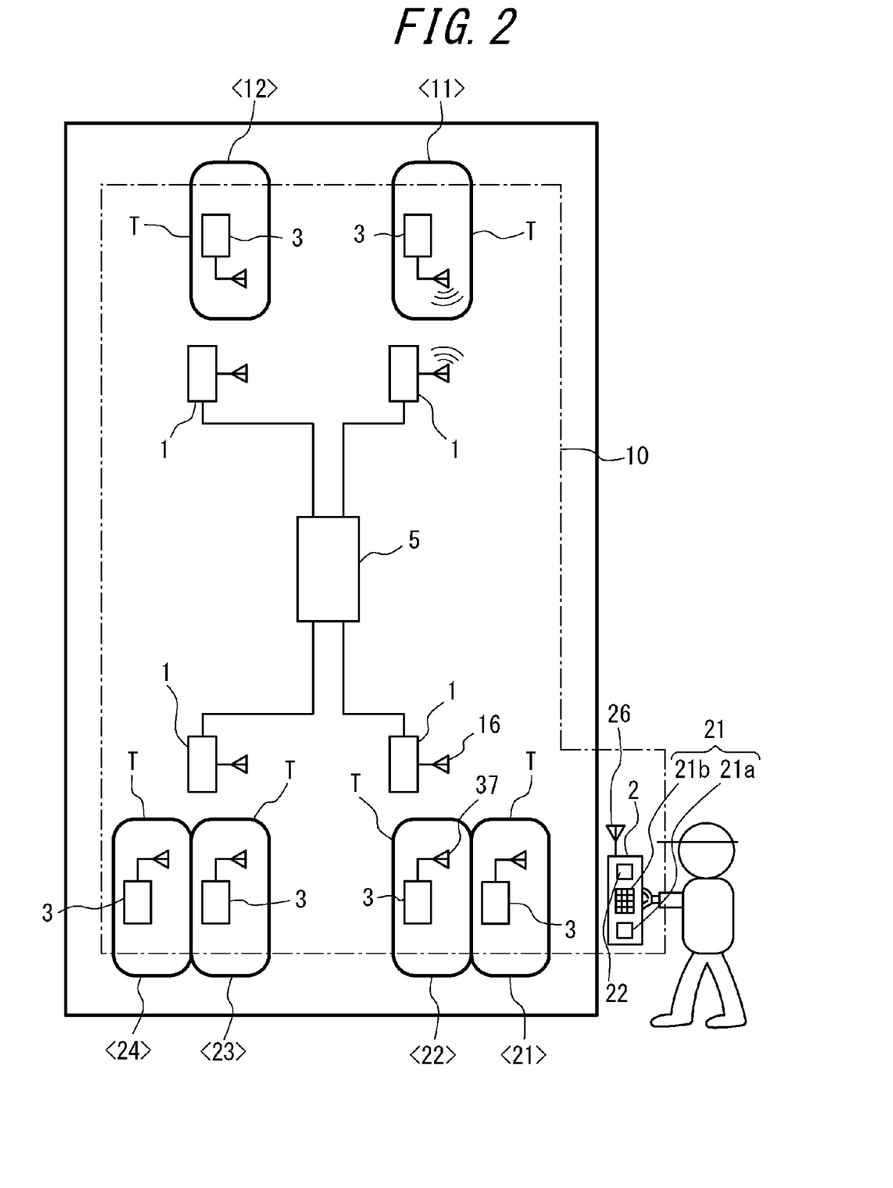
FIG. 2 is a block diagram showing a structure of the tire state variables management system of the embodiment of the present invention.

An embodiment of the present invention will be described with reference to drawings. FIG. 1 is a sectional view showing a sensor module in a state in which the sensor module is provided in a tire. FIG. 2 is a schematic arrangement diagram showing a structure of a tire state variables management system.

A tire state variables management system 10 is provided in a vehicle V and structured to include a sensor module 3 mounted inside each tire T and an external module 2 disposed on the outer side of the vehicle, for transmitting to the sensor module 3 a command signal for requesting transmission of data and receiving data transmitted from the sensor module 3. The tire state variables management system 10 preferably includes, in addition to the sensor module 3 and the external module 2, a vehicle body side module 1 provided fixedly on the vehicle body side of the vehicle, for transmitting to the sensor module 3 a command signal for requesting data transmission and receiving data transmitted by the sensor module 3.

In a case as shown in FIG. 2, the tire state variables management system 10 is provided with a central control module 5 for commanding the vehicle body side module 1 to acquire data from the sensor module 3.

In the present embodiment, each sensor module 3 has, for example, a structure as shown in FIG. 1, in which a case 3b installing electronic members therein is integrally mounted on a rubber base 3c. The rubber base 3c is attached to the inner face of the tire T in a thermally fused manner so that the sensor module 3 does not come off from the tire T or breaks when the tire in a running state is deformed under load.

In the present embodiment, each of the external module 2 and the vehicle body side module 1 can send to the sensor module 3 a command signal for requesting data transmission and receive data from the sensor module 3. The external module 2 is mainly used when tire state variables are acquired in a state the vehicle is stopping in a garage or the like, while the vehicle body side module 1 is used when tire state variables are to be acquired during running of the vehicle.

Figure 3:
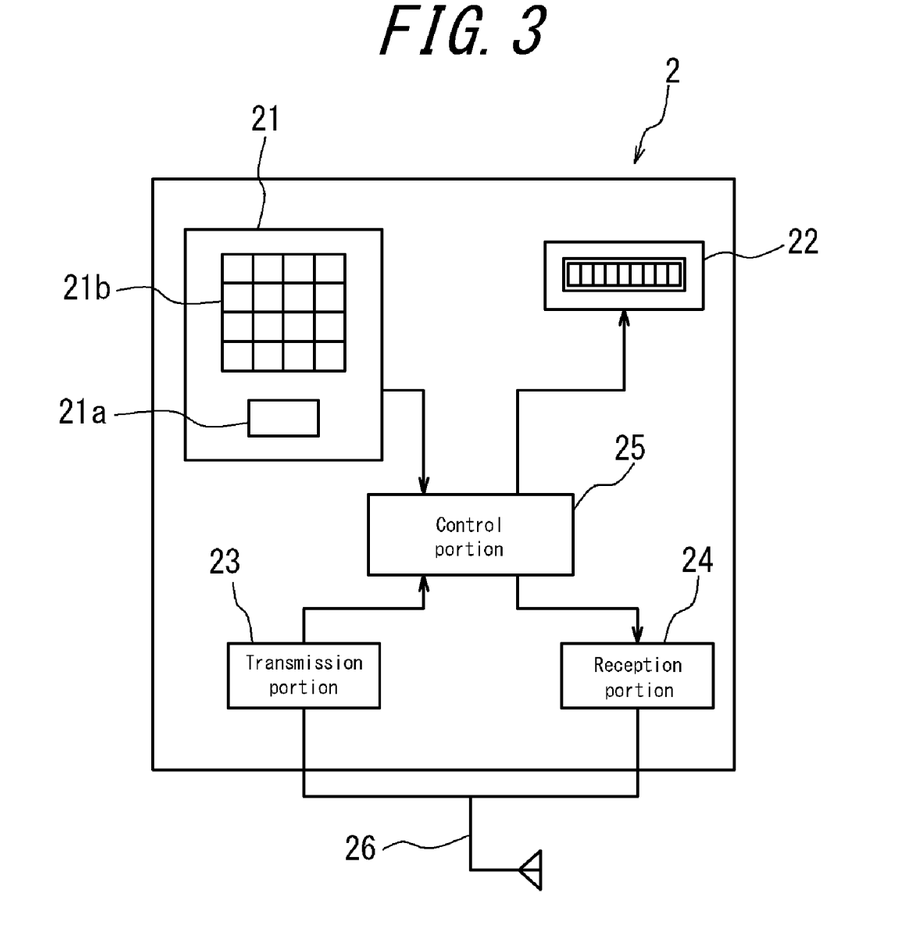
FIG. 3 is a block diagram showing a structure of an external module.

Hereinafter, a procedure for acquiring data of tire state variables from the sensor module 3 by using the modules 1, 2 will be described. FIG. 3 is a block diagram showing a structure of the external module 2. The external module 2 has: an input portion 21 including an input key 21b for an operator to input data such as information for identifying a vehicle, a transmission button 21a for inputting transmission of a command signal, and the like; a display portion 22 for displaying inputted data or data transmitted from the sensor module 3; a transmission portion 23 for transmitting the command signal to the sensor module; a reception portion 24 for receiving data from the sensor module 3; and a control portion 25 for controlling these portions of the external module 2. In FIG. 2, reference number 26 represents a transmission/reception antenna for transmission of the command signal/reception of data.

The operator using the external module 2 structured as described above inputs into the input portion 21 information for identifying a vehicle and information of a position at which a tire is mounted on the vehicle by using the input key 21b and then pushes the transmission button 21a. When the transmission button 21a is pushed, the control portion 25 effects control so that the transmission portion 23 transmits a command signal for requesting data transmission, which signal includes the information for identifying a vehicle and the information of a position at which a tire is mounted on the vehicle inputted by the operator.

Figure 4:
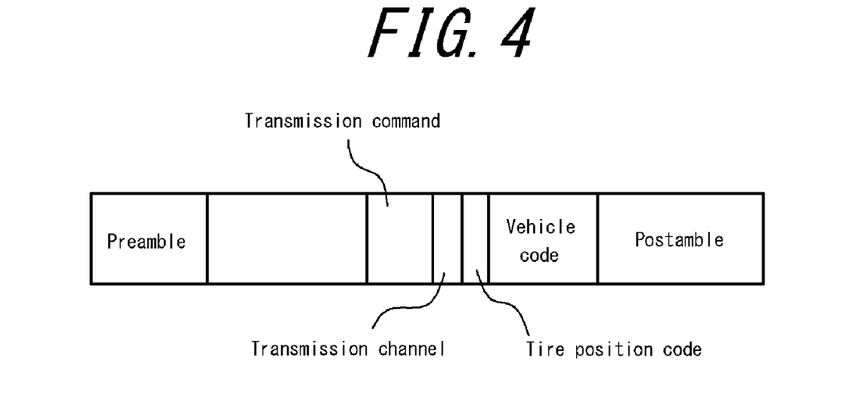
FIG. 4 is a data structure diagram showing a data structure of a command signal transmitted by the external module.

FIG. 4 is a data structure diagram showing a data structure of a command signal transmitted from the external module 2 in such a situation as described above. The command signal includes a "transmission command" which commands a data transmission request, a "vehicle code" which functions as information for identifying a vehicle to specify a sensor module 3 as a target of data request, a "tire position code" which functions as information of a position at which a tire is mounted on the vehicle, and a "transmission channel" which is to be used by the sensor module 3 upon transmission of data (the external module 2 specifies a frequency range to be used by the sensor module 3 upon data transmission therefrom. The "transmission channel" is determined in accordance with this frequency range).

Figure 5:
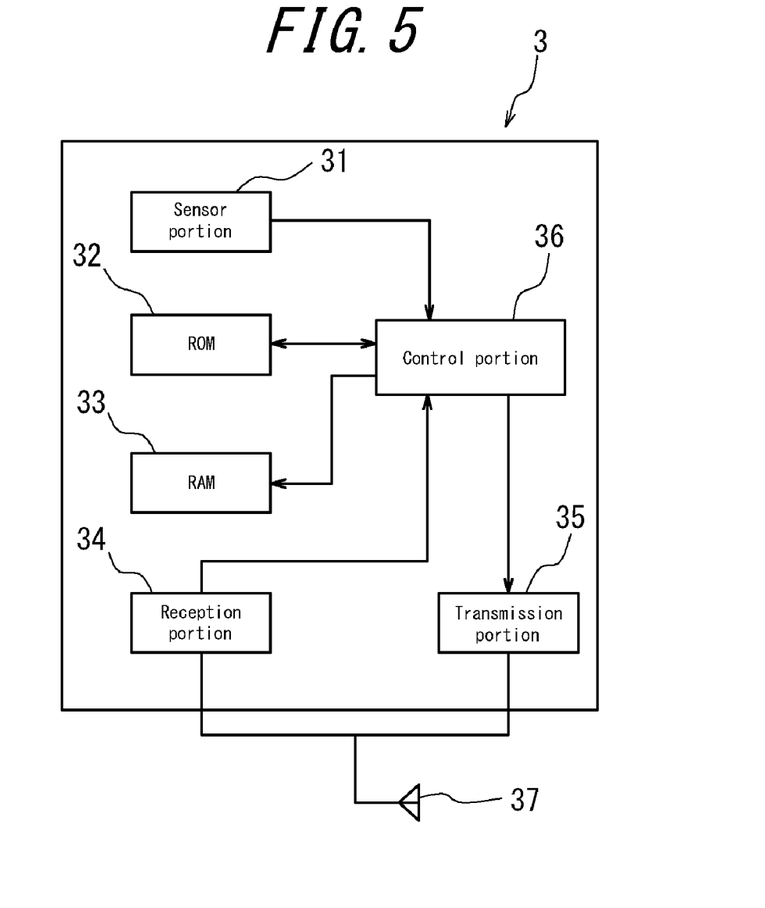
FIG. 5 is a block diagram showing a structure of the sensor module.

On the other hand, the sensor module 3 is, as shown in a block diagram of FIG. 5, structured to include a sensor portion 31 for detecting internal pressure, ROM 32 for memorizing a sensor module ID, a memory 33 for memorizing vehicle identifying information relating to the sensor module itself and information of the tire position of the sensor module itself, a reception portion 34 for receiving a command signal from the external module 2 or the vehicle body side module 1, a transmission portion 35 for transmitting data of tire state variables such as internal pressure, and a control portion 36 for controlling these portions of the sensor module as a whole. In FIG. 5, reference number 37 represents a transmission/reception antenna for receiving a command signal/transmitting data.

When the reception portion 34 of the sensor module 3 receives a command signal from the external module 2, the control portion 36 checks whether or not both of the information for identifying a vehicle and the information of a position at which a tire is mounted on the vehicle, included in the command signal, coincide with the corresponding information of the sensor module itself stored in the memory 33. In a case where the received information coincides with the stored one, the control portion 36 effects control so that data of internal pressure is obtained from the sensor portion 31 and then the transmission portion 35 transmits the thus obtained data by using the "transmission channel" specified as information in the command signal.

The structure of data transmitted from the sensor module 3 in such a situation as described above is as shown in FIG. 6. The data includes "pressure data" and a "voltage value of the cell" and, in addition thereto, "temperature data" and the like in a case where temperature data of the tire inner hollow portion is needed.

As described above, in the tire state variables management system 10 of the present invention, information for identifying a sensor module 3 as the target of data acquisition is transmitted from the external module 2 such that the information is included in a command signal. Accordingly, even when plural sensor modules 3 simultaneously receive the command signal, only the sensor module 3 of which identification information coincides with that included in the command signal transmits data, whereby the problem of the conventional tire state variables management system, that the sensor module 3 as the data transmission source cannot be specified, can be prevented from occurring.

Further, it is also possible to allow a number of sensor modules to simultaneously receive radio wave by increasing radio wave strength of a command signal, whereby, in a case where the external module 2 is a hand-held type, an operator no longer needs to move to the proximity of a particular tire. In a case where the external module 2 is a fixed type, it is no longer necessary to meticulously restrict positions and postures of a vehicle approaching the external module. In either case, there can be obtained an effect that respective sensor modules can be reliably specified.

In the present embodiment, preferable examples of the information for identifying a vehicle, contained in the command signal, include a code uniquely assigned for each of all vehicles which are under management of the tire state variables management system 10. Regarding the information of a position at which a tire is mounted on the vehicle, contained in the command signal, each tire position can be set to be represented by a code, e.g. <11> for the front right wheel, <12> for the front left wheel and <21> for the rear right outer side wheel, so that all an operator has to do is only inputting these codes and thus an input operation can be made simple.

Further, regarding a vehicle code as described above, the code can be directly scribed on a nameplate or the like of the vehicle body, so that all an operator has to do is inputting the vehicle code read out from the nameplate into the input portion 11. As a result, troublesome work such as taking a note of the vehicle code in advance or the like can be eliminated. Yet further, the same vehicle code once inputted can be automatically used again and again for use thereafter unless the code is erased or overwritten, so that the first single input of a vehicle code suffices when the state variables of plural tires mounted on the same vehicle are continually acquired. As a result, the input operation can be made very effective.

As described above, in the present invention, combination of information for identifying a vehicle and information of a position at which a tire is mounted on the vehicle is preferably used as information for uniquely identifying each sensor module 3. Accordingly, an operator can efficiently input the required information described above in a simple and easy manner. A sensor module ID as a code which has been uniquely assigned for each sensor module 3 could be used instead of the combination of the information described above. However, in this case, unless an operator obtains in advance information of which sensor module 3 having which sensor module ID has been mounted at which tire position of which vehicle, the sensor module from which data is to be acquired would not be successfully specified and an operation work for inputting information for effect necessary identification would be quite troublesome.

Figure 7:
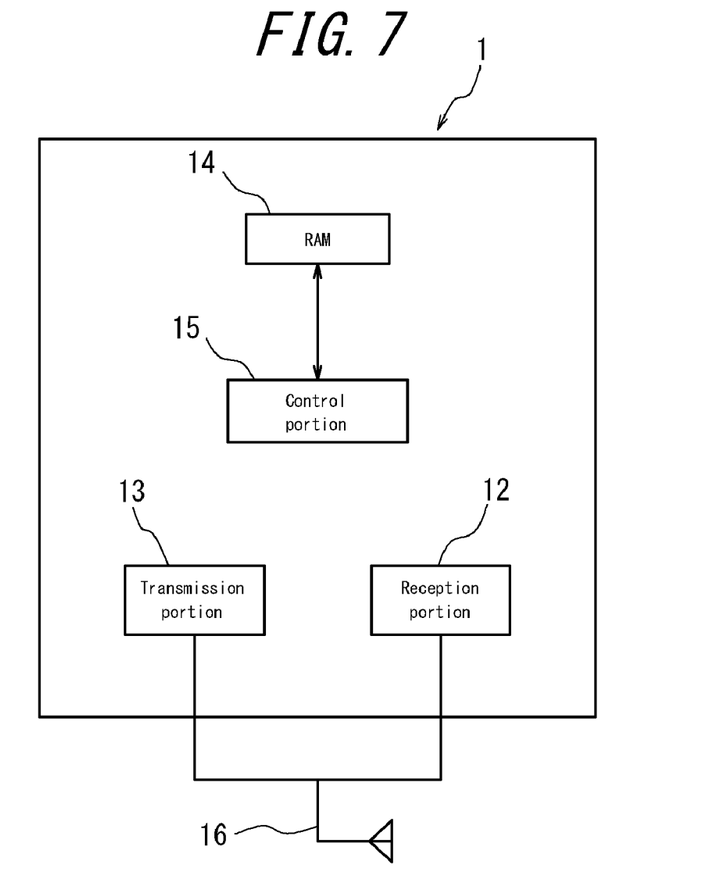
FIG. 7 is a block diagram showing a structure of a vehicle body side module.

Next, a procedure in a case where data of tire state variables is acquired from a sensor module 3 by using the vehicle body side module 1 will be described. FIG. 7 is a block diagram showing a structure of the vehicle body side module 1. The vehicle body side module 1 has: a transmission portion 13 for transmitting a command signal for requesting data transmission to the sensor module 3; a reception portion 12 for receiving data from the sensor module 3; a memory 14 for memorizing a sensor module ID, information for identifying a vehicle and information of a position at which a tire is mounted on the vehicle for at least one sensor module from which data is to be acquired; and a control portion 15 for controlling these portions described above of the vehicle body side module 1. In FIG. 7, reference number 16 represents a transmission/reception antenna for transmitting a command signal/receiving data.

In the vehicle body side module 1 structured as described above, the control portion 15 controllably transmits from the transmission portion 11, based on a command from the central control module 5 or at preset timing, a data transmission command signal containing a sensor module ID, information for identifying a vehicle and information of a position at which a tire is mounted on the vehicle.

Figure 8:
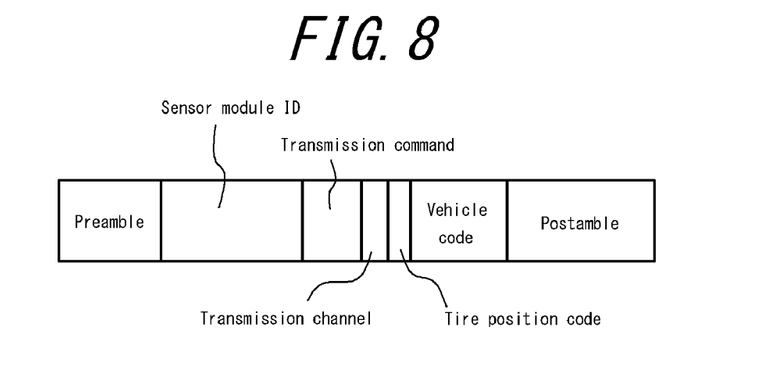
FIG. 8 is a data structural diagram showing a data structure of a command signal transmitted by the vehicle body side module.

FIG. 8 is a data structure diagram showing a data structure of a command signal transmitted by the vehicle body side module 1. The command signal includes: a "transmission command" which commands a data transmission request; "sensor module ID" as information for specifying a sensor module 3 as a target of data transmission request; combination of a "vehicle code" as information for identifying a vehicle and a "tire position code" as information of a position at which a tire is mounted on the vehicle, which codes are to be possessed as self-identifying information by the sensor module having the aforementioned sensor module ID; and a "transmission channel" which is to be used by the sensor module 3 upon transmission of data (the vehicle body side module 1 specifies a frequency range to be used by the sensor module 3 upon data transmission therefrom. The "transmission channel" is determined in accordance with this frequency range).

Figure 6:
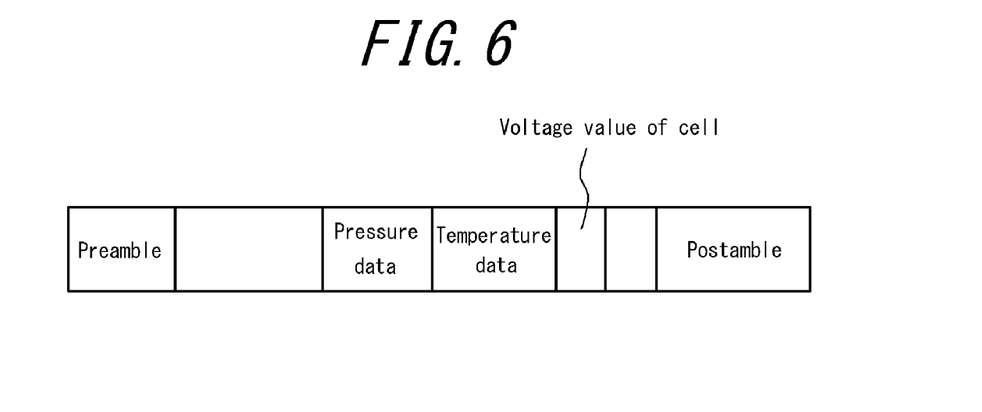
FIG. 6 is a data structure diagram showing a data structure of a command signal transmitted by the sensor module.

With the arrangement described above, when the receiving portion 34 of the sensor module 3 receives a command signal from the vehicle body side module 1, the control portion 36 checks whether the sensor module ID contained in the command signal coincides with the sensor module ID of the sensor module 3 itself stored in the ROM 32 or not. In a case where the sensor module ID contained in the command signal coincides with the sensor module ID of the sensor module 3 itself, the control portion 36 controllably collects data regarding information of internal pressure from the sensor portion 31 and makes the transmission portion 35 transmit the thus obtained data by using the "transmission channel" specified as the information in the command signal. The structure of data transmitted by the sensor module 3 at this time is as shown in FIG. 6 explained above.

Further, in a case where the sensor module ID contained in a command signal coincides with the sensor module ID of the sensor module 3 stored in ROM 32 upon receiving the command signal, the combination of information for identifying a vehicle and information of a position at which a tire is mounted on the vehicle, which combination is contained in the command signal, is stored in the memory 33 for every time upon the reception of the command signal, so that the relevant information is renewed. Yet further, when the sensor module 3 receives a command signal from the external module 2, the aforementioned combined information, i.e. information for identifying a vehicle and information of a position at which a tire is mounted on the vehicle, stored in the memory 33, is used as information for correlating the sensor module 3 itself with the command signal, as described above.

As described above, the combined information, i.e. information for identifying a vehicle and information of a position at which a tire is mounted on the vehicle, stored in the memory 33, is renewed to the latest information as long as the vehicle is driven and transmission/reception of data is carried out between the vehicle body side module 1 and the sensor module 3. Therefore, even right after carrying out tire rotation, data can be acquired from a correct sensor module 3 upon request of data transmission from the external module 2 to the sensor module 3, without necessitating any special work.

As described above, information for identifying a vehicle and information of a position at which a tire is mounted on the vehicle, stored in the memory 33 of the sensor module 3, is given from the vehicle body side module 1. Therefore, the sensor module ID, the information for identifying a vehicle and information of a position at which a tire is mounted on the vehicle, stored in the vehicle body side module, need to be rewritten when the vehicle body side module is newly installed in a vehicle and when rotation of tires occurred in the vehicle. This rewriting can be either automatically provided from a control portion which controls the tire state variables management system 10 as a whole to the respective vehicle body side modules 1 via the central control module 5 of each vehicle or carried out by first an operator manually inputting a new set of the sensor module ID, the information for identifying a vehicle and information of a position at which a tire is mounted on the vehicle, into a handy device with a transmitter exclusively for rewriting, and then transmitting the data inputted via this device exclusively for rewriting to the vehicle body side module 1.

In the present embodiment, the information for identifying a vehicle and the information of a position at which a tire is mounted on the vehicle, stored in the memory 33 of the sensor module 3, are preferably erased when the sensor module 1 has failed to receive any command signal from the vehicle body side module 1 for a predetermined period, e.g. approximately an hour. As a result, a sensor module of a tire which has been removed from a vehicle and put into storage can be prevented, if the sensor module receives a command signal from the external module 1, from erroneously transmitting data.

INDUSTRIAL APPLICABILITY

The tire state variables management system according to the present invention can be suitably used for management of a tire, in particular, a tire for construction vehicles.

The invention claimed is:

1. A tire state variables management system provided with: a sensor module mounted on each tire of a vehicle having plural tires, for detecting tire state variables including tire internal pressure and transmitting data of the tire state variables on the basis of a command signal from the outside of the vehicle; and an external module disposed on the outer side of the vehicle, for transmitting the command signal to the sensor module and receiving the data transmitted from the sensor module to acquire data of the tire state variables, characterized in that:

each sensor module possesses a self-identifying code for distinguishing itself from other sensor modules;
   the command signal transmitted by the external module includes the self-identifying code possessed by the sensor Module from which data is to be acquired; and
   each sensor module is adapted to transmit the data only when the self-identifying code included in the command signal from the external module coincides with the self-identifying code possessed by the sensor module itself,
   wherein the sensor module is adapted to possess a serial number which is inherent thereto and irrelevant to the tire state,
   the tire state variables management system further comprises a vehicle body side module provided on the body side of the vehicle, for transmitting to the sensor module a command signal for requesting transmission of data regarding the tire state variables,
   the command signal transmitted by the vehicle body side module includes the serial number possessed by the sensor module of which data is to be acquired, information for identifying the vehicle having the tire on which the sensor module of which data is to be acquired is mounted, and information of a position at which the tire is mounted in the vehicle, in combination, and
   each sensor module has a memory and is adapted to store therein the information for identifying the vehicle and the information of a position at which the tire is mounted in the vehicle, which are included in combination in the command signal, only when the serial number included in the command signal from the vehicle body side module coincides with the serial number possessed by the sensor module.

2. The tire state variables management system of claim 1, wherein the self-identifying code comprises the information for identifying the vehicle on which the tire corresponding to the sensor module is mounted and the information of the position at which the tire is mounted, in combination.

3. The tire state variables management system of claim 1, wherein the sensor module is adapted to erase the information for identifying the vehicle and the information of a tire mounting position memorized in combination in the memory when the sensor module has not received the command signal from the vehicle body side module in a predetermined period or longer.

4. The tire state variables management system of claim 1, wherein
   the vehicle body side module transmits, based on a command from a central control module provided in the vehicle or at preset timing, said command signal, and
   the each sensor module is adapted to store in the memory the information for identifying the vehicle and the information of the position at which the tire is mounted in the vehicle, which are included in combination in the command signal, only when the serial number included in the command signal from the vehicle body side module coincides with the serial number possessed by the sensor module, such that the information in the memory is renewed.

5. The tire state variables management system of claim 4, wherein the sensor module is adapted to erase the information for identifying the vehicle and the information of a tire mounting position memorized in combination in the memory when the sensor module has not received the command signal from the vehicle body side module in a predetermined period or longer.

* * * * *